United States Patent [19]

Popov

[11] Patent Number: 4,607,814

[45] Date of Patent: Aug. 26, 1986

[54] BALLISTIC RECOVERY SYSTEM

[76] Inventor: Boris Popov, 14155 44th St. South, Afton, Minn. 55001

[21] Appl. No.: 541,787

[22] Filed: Oct. 13, 1983

[51] Int. Cl.[4] ............................................. B64D 17/72
[52] U.S. Cl. .................................... 244/147; 244/139; 102/206
[58] Field of Search ...... 244/139, 147, 149, DIG. 1.5; 102/206, 217–220, 265

[56] References Cited

U.S. PATENT DOCUMENTS

| 1,324,392 | 12/1919 | Gray | 244/147 |
| 1,770,954 | 7/1930 | Stone | 244/147 |
| 3,378,218 | 4/1968 | Robertson et al. | 244/147 |
| 3,442,212 | 5/1969 | Ferrell | 102/219 |
| 3,675,578 | 7/1972 | Douglas et al. | 102/202.5 |
| 3,834,313 | 9/1974 | Sato | 102/215 |

FOREIGN PATENT DOCUMENTS

| 2069425 | 8/1981 | United Kingdom | 244/147 |
| 2094487 | 9/1982 | United Kingdom | 102/206 |

Primary Examiner—Trygve M. Blix
Assistant Examiner—Rodney Corl

[57] ABSTRACT

A dual system for ballistic deployment of a parachute (40) caused by explosion of a powder charge (54) to propel a projectile (52) away from an air vehicle, pulling the parachute (40) away from the air vehicle and allowing the parachute to inflate free of the air vehicle. The powder charge (54) is exploded alternatively by the pilot pulling a pull handle (12) to send an igniting current to fire cap (55), or by the pilot pulling handle (70) to activate a spring driven firing pin (80) to fire cap (82); the firing of cap (55) or the firing of cap (82) will explode the powder charge (54).

3 Claims, 7 Drawing Figures

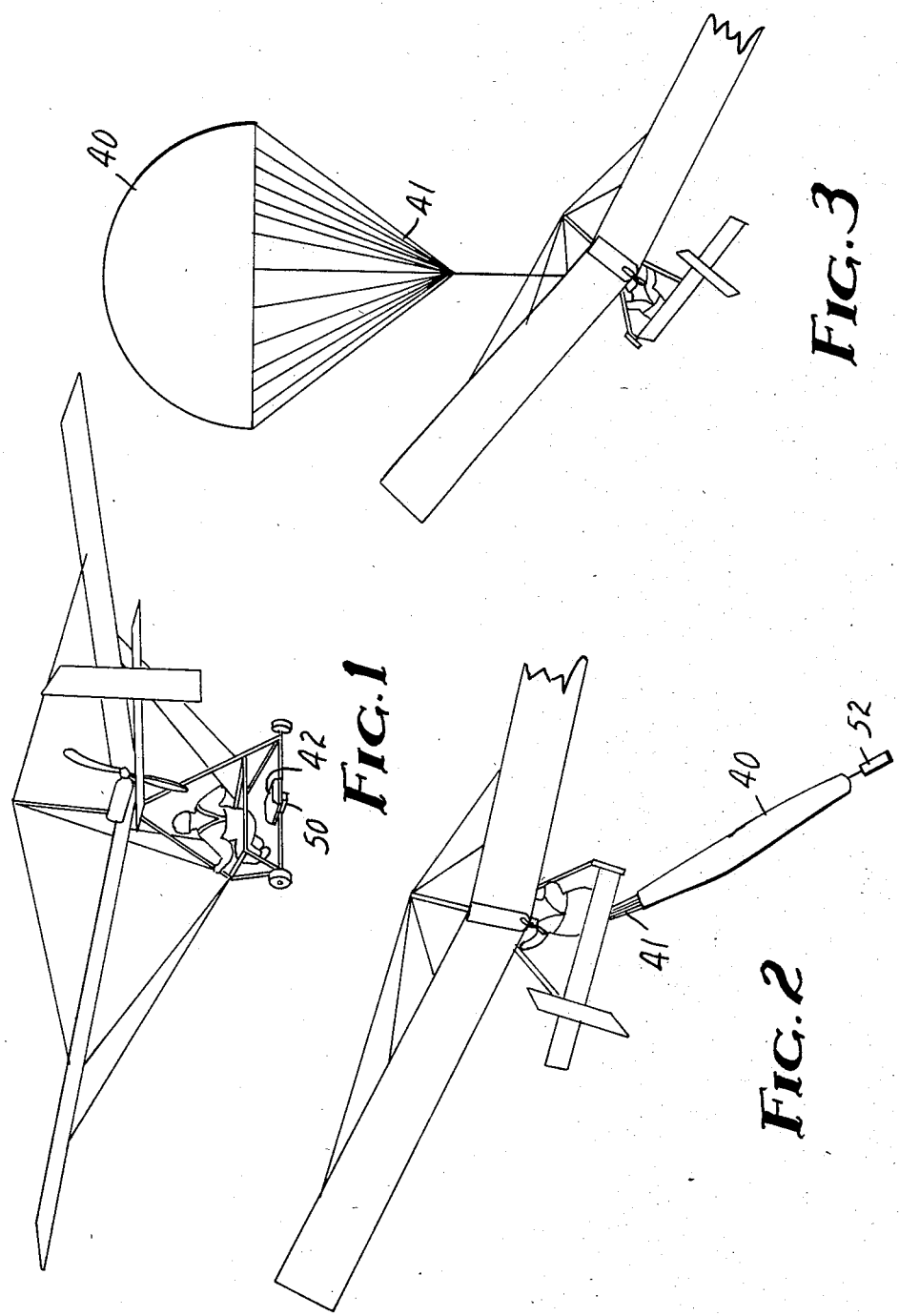

BALLISTIC RECOVERY SYSTEM

BACKGROUND OF THE INVENTION

The present invention relates broadly to an apparatus that can be adapted and added to a hang glider, or ultralight air vehicle, to provide rapid deployment of a parachute should such an emergency arise; and thus provide additional safety to the operator of the hang glider (or ultralight air vehicle).

The present apparatus was developed for use on either a hang glider, or ultralight air vehicle, or any such air vehicle that needs a parachute deployed rapidly.

According to the June 1981 issue of "Glider Rider", there were 51 fatalities reported in 1980 resulting from the accidents during use of hang gliders. Such fatalities are often caused by an inexperienced pilot, but even an experienced pilot may fail to properly strap himself into the hang glider, collide with another hang glider, develop a low altitude stall, etc. and not be able to correct the situation and ultimately crash. Fatal crashes have been associated with hang gliders and ultralight air vehicles since they were first developed.

In 1977 a few manufacturers associated with hang gliding began manufacturing and distributing a new low weight manually thrown parachute that was part of the pilot's harness. These parachutes were designed to be manually thrown entirely clear of the glider by the pilot. Once clear of the glider, such a parachute would then fully inflate; this of course assumes that the pilot would and could take his hands off the controls long enough to throw the parachute, that the pilot could throw the chute clear of the air vehicle and that the situation would be such that there would be sufficient time to enable the parachute to fully inflate and sufficiently slow down the falling glider before crashing into the ground. In a vast majority of hang glider and ultralight accidents, a manually thrown parachute system is generally not an effective solution to the emergency for various reasons. It is thought that in many cases when the pilot would effectively throw the chute away from the glider, but the lines of the chute would become entangled in the glider because the pilot could not throw the chute with enough force for the chute to sufficiently clear the air vehicle, and consequently the chute would become entangled with the glider and not inflate.

Another reason why a manually thrown parachute is not an adequate solution is that in an emergency situation, it would not be unusual for the glider to fall at a speed of 60 mph, or 88 feet per second, toward the ground. To so fall from an altitude of 400 feet, at a rate of 88 feet per second, allows for only five seconds to pull, throw and fully inflate a parachute that is part of the pilot's harness. That is not enough time! The minimum altitude for reasonable deployment chances of a conventionally thrown parachute is thought to be approximately 500 feet. Since a high proportion of hang glider problems begin below 500 feet and even below 300 feet, a manually thrown chute is generally inadequate since such would not have sufficient time to open and safely act on the hang glider.

The present invention provides a dual system, a redundant system, for ballistic deployment of a parachute with the use of an explosive charge to propel the packed parachute away from the structure of the hang glider (or ultralight) and cause the parachute to clear the air vehicle and fully inflate within two seconds and provide the operator with a relatively safe descent toward the ground. A single explosive charge can be activiated, or exploded, electrically by manually pulling on a handle, or alternatively, the same charge can be activated by manually pulling on a second handle that acts as a mechanical trigger mechanism to fire the charge. Thus the ballistic recovery system of the present invention can be operated with only the mechanically activated system, or alternatively with the electrically activated system, and the redundancy of the two different separate activation systems provides much greater safety for the operator.

In the present invention, the parachute deployment package, or the "packed" parachute, is generally secured to the landing gear of the air vehicle, although it may be attached differently to alternative frame portions for different aircrafts. When the system is activated and the charge is exploded in an emergency situation, a projectile attached to the top of the parachute will be shot away from the glider pulling parachute out of its package or container. To activate the system, the pilot simply pulls a first handle that triggers a mechanical firing mechanism to explode a small powder charge; or, alternatively, the pilot pulls a second alternative handle that closes an electrical contact which activates an electrical charge to ignite the small powder charge. By either activation, the small powder charge blows the projectile and the parachute away from the air vehicle at approximately 300 feet per second, extending and opening the parachute behind the air vehicle. As a result of the fully deployed and inflated parachute, the pilot secured to the air vehicle is brought down to a relatively safe landing. This system deploys a parachute with sufficient speed and in minimal elapse time to enable full inflation of the chute at altituudes below 100 feet. In comparison, the system of manually throwing a chute from the air vehicle has a minimal operating altitude of approximately 500 feet. The safety advantages of the present system should be readily apparent.

SUMMARY OF THE INVENTION

The present invention is a rapid deployment parachute apparatus with redundant and alternative activation systems including a trigger mechanism to explode a small powder charge that will rapidly deploy a parachute attached to a hang glider or ultralight air vehicle wherein the parachute can be deployed and operational at a relatively low altitude. The parachute is of the type which can be rapidly opened in the air. Alternatively, the small powder charge can be exploded by an electrical charge.

BRIEF DESCRIPTION OF THE DRAWINGS

FIG. 1 is a perspective view of an ultralight air vehicle, in normal use, with a ballistic recovery system;

FIG. 2 is a perspective view depicting a wing broken from the air vehicle of FIG. 1 and with the ballistic recovery system having been activated, the parachute is being deployed;

FIG. 3 is a perspective view depicting the air vehicle of FIG. 2 with the parachute fully deployed;

DETAILED DESCRIPTION OF THE PREFERRED EMBODIMENT

Figure 4:
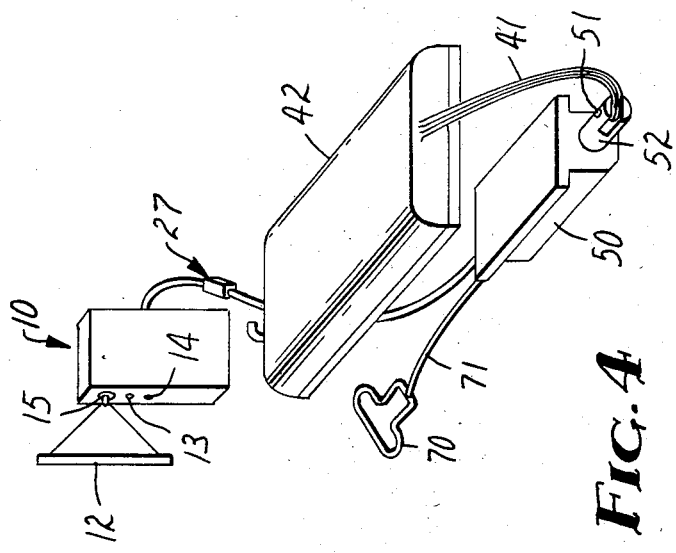
FIG. 4 is a perspective view depicting the ballistic recovery system separated from the air vehicle.

FIG. 1 shows an ultralight in normal operation flight with a ballistically operated parachute recovery system of the present invention attached to the landing frame of the air vehicle. Should an emergency arise, as depicted in FIG. 2, the pilot operator would pull one of the two handles (12 or 70 as shown in FIG. 4) and explode a small powder charge to ballistically fire the projectile 52 to the rear of the air vehicle. The projectile 52, in turn, pulls the parachute 40 from its container 42 and the parachute inflates as shown in FIG. 3.

The following describes the portion of the embodiment for electrically exploding the powder charge 54.

Figure 5:
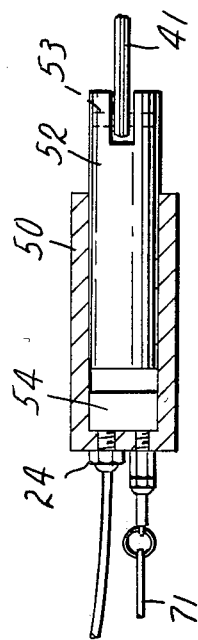
FIG. 5 is a cross sectional view of the projectile housing with the electrically activated and mechanically activated cartridges in place.
Figure 7:
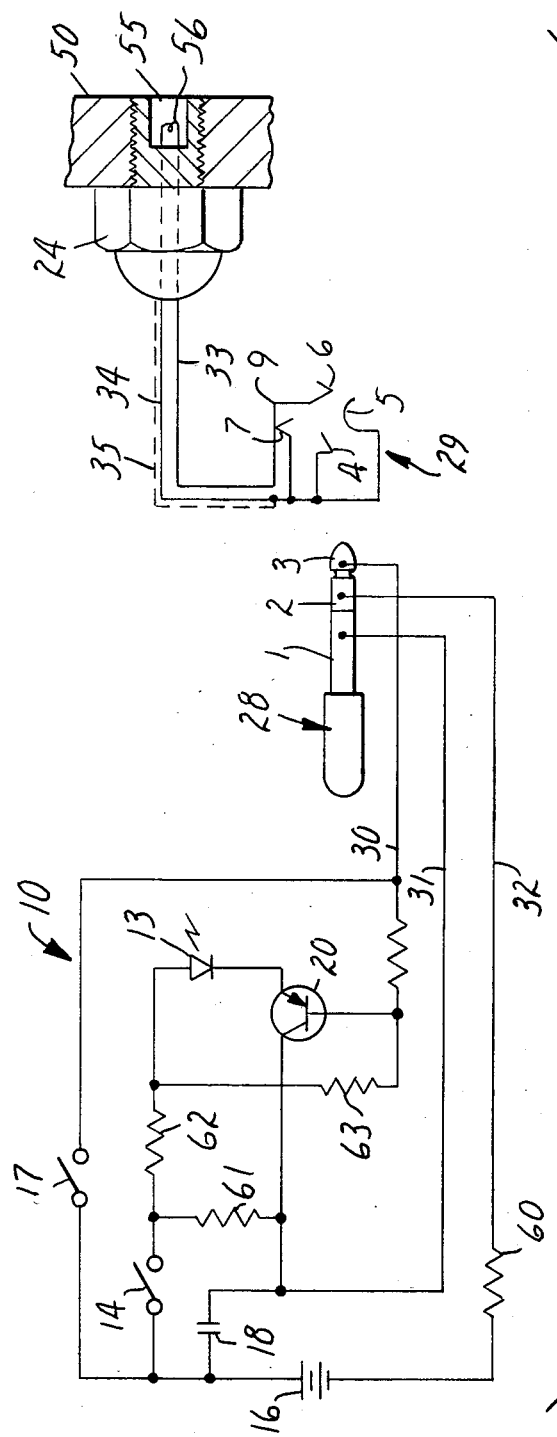
FIG. 7 is a combined mechanical and electrical drawing showing the connection probe and receptacle electrically to be connected to electrical discharge cartridge, and an electrical schematic drawing of the test and firing circuits of the electrically activiated cartridge.

As shown in FIG. 4, an activating pouch 10 normally strapped to the pilot includes a pull handle 12, test light 13, test button 14, pull plug 15 and battery 16 (see also FIG. 7). Interconnected between the pouch 10 and the electrically fired cartridge 24 (see FIGS. 5 and 7) secured to the projectile housing 50, is an electrical connector 27 including a three connection electrical plug 28 and a mating three connection electrical receiver 29 (see FIG. 7).

The electrical plug 28 (see FIG. 7) includes wires 30, 31, 32 connected to contacts 1, 2, and 3, respectively, of the plug 28. In actuality, lines 30, 31 and 32 are within the plug 28 along the longitudinal direction of the plug to reach the contacts 1, 2 and 3 and are shown electrically in FIG. 7. The receiver 29 includes contacts 4, 5, 6 and 7. As shown in FIG. 7, contact 6 connects to wire 33 and contact 4 connects to wire 34 and shield 35. Contact 5 also connects to wire 34 and shield 35. As the plug 28 is partially inserted into the receiver 29, contact 3 engages contact 6 and mechanically opens the contact 7 and grounds out any possible residual electricity in the circuitry to prevent accidental firing of the powder in the cap 55. Also, while contact 3 engages contact 6, contact 5 engages contact 2 to ground line 32. When the plug 28 is fully inserted into receiver 29, contact 3 will electrically connect with contact 6, contact 2 will electrically connect with contact 5 and contact 1 will electrically connect with contact 4; and the connection at contact 7 will be electrically open caused by the bulb end of plug 28 (at contact 3) pushing the strap connector 9 away from contact 7. Line 30 will then be in electrical connection with line 34, grounded to the sheath 35 and line 32.

The deploy switch 17 (electrically normally open) is mechanically connected to the pull plug 15 shown in FIG. 4. When handle 12 is manually pulled in an emergency situation, the pull plug 15 separates from the pouch 10 and switch 17 is closed, which allows capacitor 18 to discharge through line 30, contact 3, contact 6, line 33, through filament 56 and back through line 34 to ground and line 32. The discharge of the capacitor 18 sends 20–40 amps of current through filament 56 (for less than 10 milliseconds) igniting cap 55, which in turn ignites the powder charge 54 and propels the projector 52 from the housing 50.

In continuing with FIG. 7, the battery 16 is 22.5 volts, transistor 20 is a 2N2905, test light 13 is a light emitting diode and resistors 60, 61, 62, 63 and 64 are 470, 330, 330, 8200 and 6800 ohms respectively. The test switch 14, when closed, sends a small current through the filament 56 and lights the test light 13 indicating that the plug 28 is fully inserted into the receiver 29 and all necessary lines and contacts are electrically completed and that the system is ready to be activated, if desired, by manually pulling the handle 12 to close the deploy switch 17.

As previously explained, a rapidly deployable parachute 40 with apex lines 41 is "packed" within the chute container 42. The apex lines 41 are secured to the projectile 52 by and around pin 53 (see also FIG. 4). As should be apparent, when the projectile 52 is driven from the housing 50 by the explosive burning of the powder charge 54, the projectile 52 pulls the parachute 40 via the apex lines 41 from the container 42 (see FIG. 2) and then the deployed parachute 40 inflates itself as shown in FIG. 3.

The following decribes the portion of the embodiment for mechanically exploding the powder charge 54.

Figure 6:
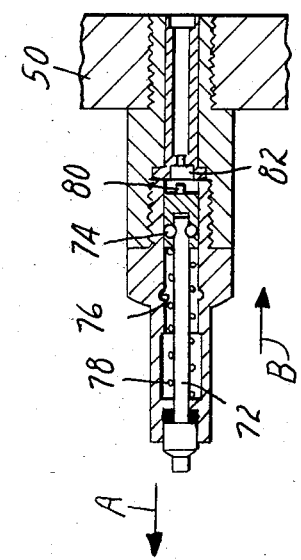
FIG. 6 is a cross sectional view of the cartridge that is activated by the mechanical firing mechanism.

The parachute 40 can be deployed, also, by the operator-pilot pulling handle 70 (see FIG. 4) and cable 71 which pulls ram 72 in direction arrow A (see FIG. 6) until the check balls 74 enter ring detent 76 allowing the spring 78 to push the firing pin 80 rapidly in direction of arrow B and explode cap 82 which in turn explodes the powder charge 54 and drives the projectile 52 from the housng 50. To fire the cap 82, the pilot pulls the handle 70 in one direction, away from the housing 50, which pulls the ram 72 and compresses the spring 78 until the check balls 74 move into the ring detent 76 which releases the spring to rapidly engage the firing pin 80. Thus, to manually fire the cap 82, requires the pilot to pull the handle 70 in one direction (which is similar to the one direction movement required of the pilot to pull handle 12 to electrically fire cap 55).

Various modifications of this invention could be apparent to those skilled in this art. For example, both handles 12 and 70 could be combined into a single handle so that the pilot could activate both the electrical and the mechanical systems at the same time for sake of redundancy of activation and to simplify activation by providing a single handle. Thus, the scope of this invention is to be limited only by the appended claims.

What is claimed is:

1. A ballistically deployed parachute recovery apparatus adapted to be attached to an air vehicle such as a glider, hang glider or ultralight, comprising
   a. a parachute container;
   b. a parachute normally folded within said parachute container and adapted to be secured to an air vehicle;
   c. a projectile housing and an explosively activated projectile contained within said housing, said projectile being attached to said parachute for pulling said parachute from the parachute container when ballistically discharged at approximately 300 feet per second;
   d. a mechanically activated first explosive cartridge within said projectile housing, adapted to explode upon mechanical activation and drive said projectile from said housing at approximately 300 feet per second;

e. means for manually exploding said first cartridge and driving said projectile from said housing to deploy said parachute;
f. an electrically activated explosive second cartridge effectively within said projectile housing, adapted to explode upon receiving an electrical charge having an amperage greater than a predetermined firing amount and adapted not to explode if said charge is less than said predetermined amount as when the electrical circuitry is being tested by an operator, upon said second cartridge exploding, said projectile is then driven from the projectile housing at approximately 300 feet per second;
g. a battery;
h. an electrical switch electrically connected between said second cartridge and said battery to permit the operator of the vehicle to selectively activate and explode said second cartridge and thus deploy said parachute; and
i. a test circuit connected to said battery and said second cartridge to allow an operator to selectively pass an electrical charge, less than said predetermined firing amount, through said second cartridge to check the electrical connections and operative status of said recovery apparatus without exploding said second cartridge.

2. The apparatus of claim 1, wherein said test circuit includes an electrical quick disconnect connection electrically wired between said second cartridge and said switch to enable said battery to be sleectively removed from the air vehicle such as for storage and battery changing operations; said disconnect constructed for controlling sequential activation of said second cartridge so that if said switch has been first electrically closed and then said electrical disconnect is electrically connected into said second cartridge, said second cartridge will not explode.

3. The apparatus of claim 2, wherein said quick disconnect connection is constructed to require that said connection has to be first electrically connected to complete the electrical circuit between said battery and said second cartridge and then said switch electrically closed before said second cartridge will explode.

* * * * *